Oct. 6, 1931.   S. B. BROWN   1,826,502
BABY WALKER
Filed July 21, 1925   2 Sheets-Sheet 2
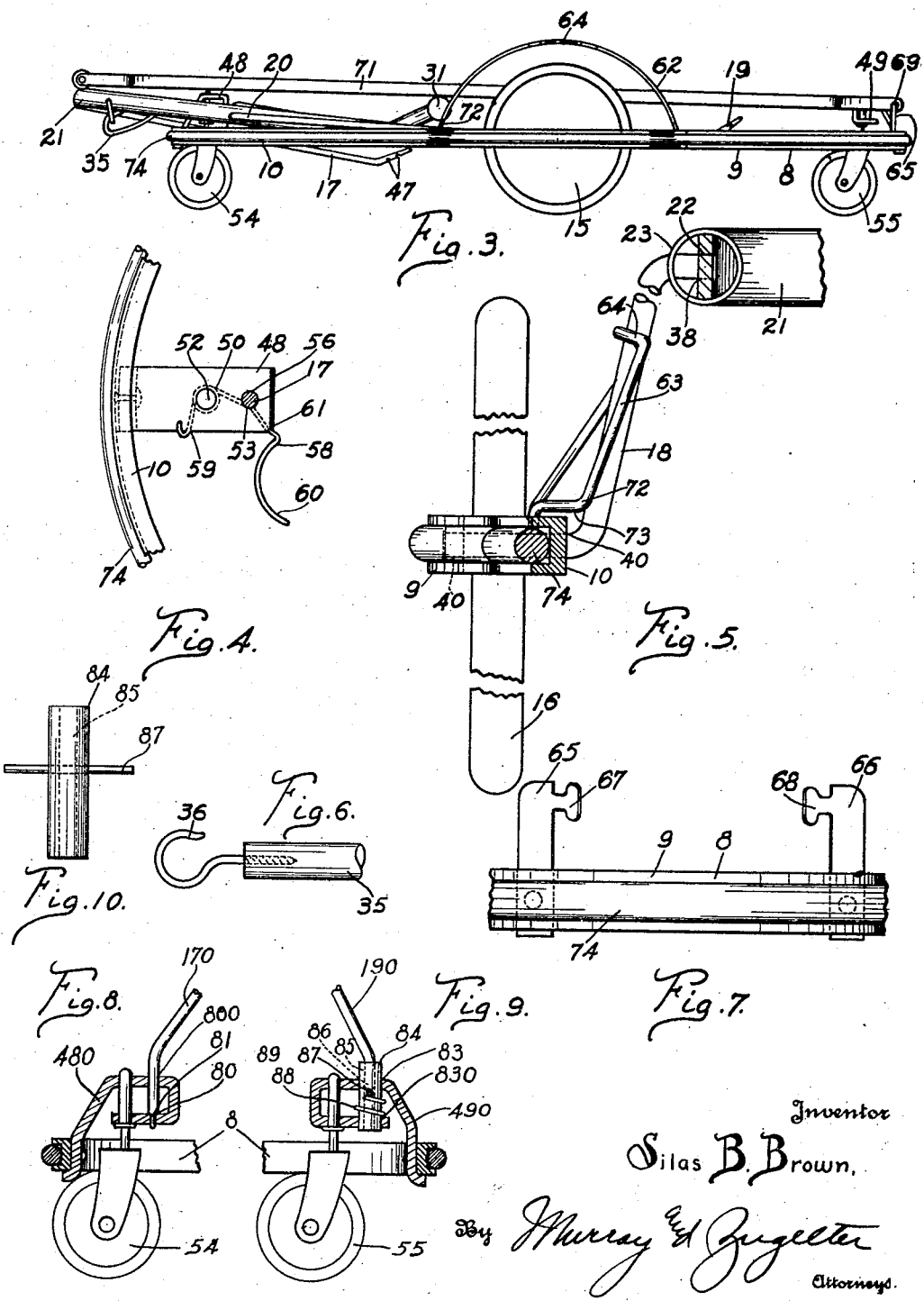

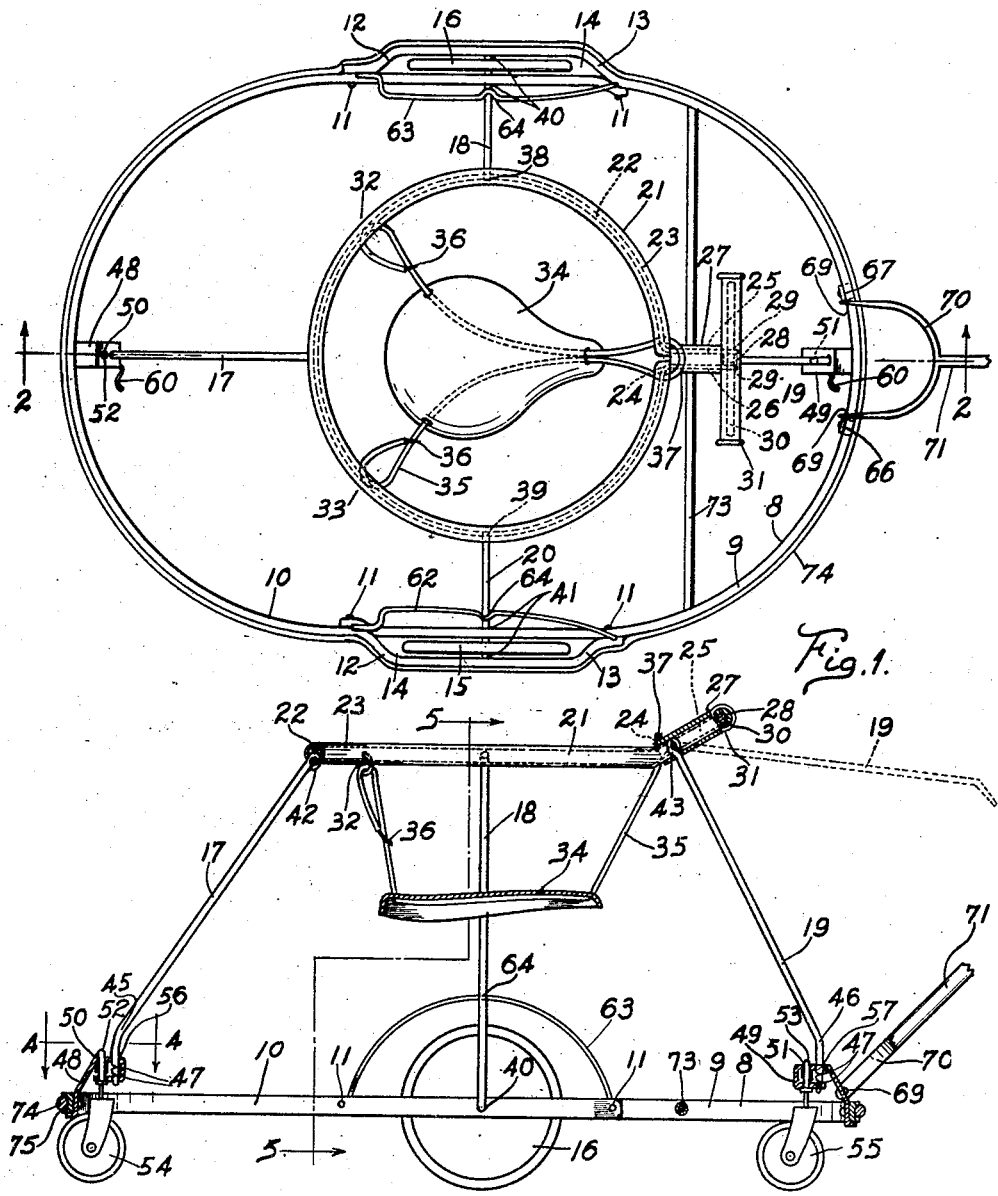

Patented Oct. 6, 1931

1,826,502

UNITED STATES PATENT OFFICE

SILAS B. BROWN, OF CINCINNATI, OHIO, ASSIGNOR TO THE EDWARDS MANUFACTURING COMPANY, OF CINCINNATI, OHIO, A CORPORATION OF OHIO

BABY WALKER

Application filed July 21, 1925. Serial No. 45,117.

An object of my invention is to provide a baby walker which is collapsible, and consequently capable of being transported on passenger vehicles and the like.

Another object is to provide means for adjustable mounting of the seat of a baby walker to accommodate children of various sizes.

Another object is to provide a means whereby a child can control the direction of the vehicle.

Another object is to provide a novel and convenient means whereby the device can be folded to its collapsible position.

These and other objects are attained by the means described herein, and disclosed in the accompanying drawings, in which:

Fig. 1 is a plan view of a baby walker of my invention.

Fig. 2 is a sectional view on line 2—2 of Fig. 1.

Fig. 3 is a view showing my device in collapsed position.

Fig. 4 is a sectional view on line 4—4 of Fig. 2.

Fig. 5 is a sectional view on line 5—5 of Fig. 2.

Fig. 6 is a view showing one end of an elastic member of my device, used for adjustably supporting the seat.

Fig. 7 discloses an arrangement whereby the vehicle may be drawn by means of a handle.

Fig. 8 is a sectional view of a modified form of locking means for use on my device.

Fig. 9 is a sectional view of a modified form of locking means use in conjunction with that of Fig. 8.

Fig. 10 is a view of a sleeve of my locking means.

A frame 8 is composed of two similar members 9 and 10, joined as shown in Fig. 1, by rivets or the like 11. The two S-curves 12 and 13, formed in each member 9 and 10, form openings 14 which are adapted to receive wheels 15 and 16. Supported by rods 17, 18, 19 and 20 is a ring member 21 composed of a flat curved strip of metal 22, covered by a tube 23 of rubber or other suitable material. The free ends 25 and 26 of the ring member 21, are bent outwardly and upwardly, as shown at 24, after which a tube of rubber, or other suitable material 27, is passed over the free ends. Between the parallel free ends 25 and 26 is passed a suitable spacer 28, the purpose of which will be disclosed later. Through perforations 29, in the free ends 25 and 26, extends a core 30, on which a soft rubber handle 31 is molded. Rings 32 and 33 passing through perforations in the strip 22 and the tube 21, suspend a seat 34, by means of a tubular or solid length of elastic material 35 such as rubber, which has screwed and cemented into its two ends, hooks 36. When hooks 36 are hooked over the elastic member 35, as shown in Figs. 1 and 2, a binding action takes place, which holds the seat in any adjusted position. The intermediate portion 37 of member 35 is passed over the handle member as is clearly shown in Fig. 1. This arrangement affords to the occupant, a seat of utmost comfort, and one from which he cannot fall. Rods 18 and 20 are pivotally mounted on the flat metal member 32, at 38 and 39, respectively, see Figs. 1 and 5. They are also pivotally mounted at 40 and 41, respectively, in the frame 8, and their lower ends are adapted to form axles for the large wheels 15 and 16. The rod 17 is pivotally mounted by means of the closed hook 42 passing through a perforation in member 22, and extending through a slit in the rubber tube 23. The rod 19 is pivoted in the same manner on the pin 43, and is thus adapted to be swung to a position shown in dotted lines in Fig. 2. The spacer 28 is used adjacent this point to permit movement of rod 19. The other extremities of rods 17 and 19 are bent at an angle as shown, at points 45 and 46, respectively. They are tapered slightly, and provided with notches 47, the purpose of which will follow presently.

Riveted, or otherwise secured to the frame 8, in alignment with rods 17 and 19, are brackets 48 and 49, which receive in bores 50 and 51, the shanks 52 and 53 of swivel casters 54 and 55, respectively. Adjacent said bores are bores 56 and 57, into which extend rods 17 and 19, respectively. Referring to Fig. 4, a length of spring wire 58, one end of which is anchored to the bracket 48 at a point 59 is coiled around the shank 52 of the caster, and then brought to a position such as shown at 53 to exert force on the rod 17. The spring wire member at this point, rests in the notches 47 and precludes the accidental removal of the rod 17 from its bore 56. When it is desired to remove the rod 17 from its bore, the curved end 60 is grasped and pulled slightly to cause disengagement of the spring from the notch, thus releasing the rod. The notch 61 is cut in the bracket to prevent vertical movement of the spring 58, when the rod 17 is inserted. The bracket 49 is likewise constructed to receive and hold rod 19.

Spring wire members 62 and 63 have their ends clamped between the frame members 9 and 10, or are otherwise secured thereto and provided with U-shaped indentations 64 to receive the rods 18 and 20, and to retain them in an operative vertical position. An offset portion 72, see Fig. 5, retains the device in a folded or collapsed position as will be disclosed hereinafter.

Secured to the frame, at the forward end of the vehicle, are members 65 and 66, which members have formed on them lugs 67 and 68. These lugs are received by perforations 69 at the ends of the forks 70 on the handle 71; thus, if a person wishes to draw the vehicle he merely squeezes together the ends of the fork and inserts them between the lugs. When the vehicle is drawn, the child may place his feet on the foot rest 73 which may be a rod covered with rubber tubing. A rubber ring 74 stretched around the frame 8, in a suitable groove 75, protects furniture or the like, when the device is used in the home. In the event that it must be transported in a public conveyance or other vehicle, the baby walker is folded to a substantially flat condition, thus making handling easy. The flexibility of the device permits removal of rods 17 and 19 from their respective bores in the brackets 48 and 49, as previously explained, the rod 19 taking the position shown in dotted lines in Fig. 2, and rod 17 swinging in the same direction to take a position as shown in Fig. 3. The spring wires 62 and 63 are sprung outwardly to disengage the rods 18 and 20 from their respective U-shaped indentations 64. The device can then be folded rearwardly to the position shown in Fig. 3. When the device is thus folded, the offset portion 72 yieldingly holds the rod 20 in the horizontal position, see Figs. 3 and 5, and consequently obviates any tendency of the device to change from its folded position.

To set up the walker to its operative position, the ring 21 is grasped and pulled upwardly to turn the whole upper frame structure on its pivotal mountings 40 and 41, and the rods 17 and 19 are inserted into the bores 56 and 57 in the brackets 48 and 49, respectively. The indentations 64 in the spring wires 62 and 63 will then engage the rods 20 and 18, as shown in Figs. 1 and 2. The device is then ready for use.

In the modified form of locking means shown in Figs. 8 and 9, the spring members 58, members 62 and 63, and notches 47 in the rods 17 and 19, are dispensed with. Bracket 480 corresponds to bracket 48 of Fig. 2, and bracket 490 to bracket 49 of Fig. 2. Rods 170 and 190 correspond to rods 17 and 19 respectively. Bracket 480 is provided with aligned perforations 80 and 800 which are adapted to receive the lower end of rod 170, which rod is provided with a shoulder 81. The perforation 80 is made smaller than the perforation 800 so as to provide a seat for the shoulder 81. Consequently, any tendency of the upper frame work to fall rearwardly will be arrested by the shoulder 81.

Bracket 490 is provided with enlarged aligned bores 83 and 830 into which bores is reciprocally received a sleeve 84, having a bore 85 adapted to receive the lower end of rod 190. The sleeve is provided with a pin 87 extending therethrough, and is held in a normally raised position shown in Fig. 9 by the action of spring 88 upon the pin 87. Downward force exerted on the pin 87 or sleeve 84 will compress the spring 88 and bring the top end of sleeve 84 practically flush with the top face 89 of the bracket. The lower end 86 of the rod 190, which normally rests on the pin 87, may then be withdrawn with little effort, from the bore 85. The rod 170 may then be disassociated from its bracket, and the whole device folded as shown in Fig. 3.

Although the baby walker of my invention is not strictly a dirigible vehicle, the provision of the handle bars rigidly secured to the frame afford a means whereby a child can learn to direct a dirigible vehicle. He will find that by holding onto the handles and pushing with either foot, he can direct his vehicle to reach an objective.

What I claim is:

1. The combination of a frame carrying brackets at the front and rear thereof, swivel casters carried by the brackets, each of which brackets has formed in it a pair of aligned bores, a sleeve reciprocally received in the aligned bores of one bracket, a second frame carrying a seat and handle bars, rods pivotally mounted on the first frame and second frame, opposed rods pivotally mounted on the second frame, one of the last mentioned rods having a shoulder formed thereon, said rod being received by the bores in the second bracket, the shoulder serving to limit the downward movement of the rod, the other of said rods having its free end received in the bore in the reciprocally mounted sleeve, and means yieldingly resisting movement of the sleeve.

2. The combination of a frame carrying brackets at the front and rear thereof, swivel casters carried by the brackets, each of which brackets has formed in it a pair of aligned bores, a sleeve reciprocally received in the aligned bores of one bracket, a second frame carrying a seat, rods pivotally mounted on the first frame and second frame, opposed rods pivotally mounted on the second frame, one of the last mentioned rods having a shoulder formed thereon, said rod being received by the bores in the second bracket, the shoulder serving to limit the downward movement of the rod, the other of said rods having its free end received in the bore in the reciprocally mounted sleeve, and means yielding resisting movement of the sleeve.

3. The combination of a frame carrying brackets at the front and rear thereof, swivel casters carried by the brackets, rods each removably secured at one end to one of the brackets, a second frame hingedly supported by said rods above and parallel to the first frame, a rod pivotally mounted on each of the two remaining sides of said first frame, intermediate the brackets, the lower ends of said rods providing axles for wheels, and the upper ends of said rods being pivotally mounted on the second frame, and a seat and handle bars carried by the second frame.

4. A device of the character described, the combination of a lower frame comprising a pair of U-shaped members each having a substantially straight arm and an arm having an offset portion adjacent its end, the members being secured one upon the other to provide a ring-like structure with the straight arm of one member overlapping the offset portion of the arm of the other member whereby to provide opposed wheel guards, an upper frame, rods pivotally mounted upon the upper frame and having their ends turned to pass through the arms comprising the wheel guards and wheels disposed within the wheel guards and revolubly mounted upon the turned ends of the rods.

5. In a device of the class described, the combination of an upper frame, a pair of rods pivotally mounted upon the upper frame, a lower frame comprising a continuous ring having wheel guards thereon, turned ends upon the rods revolubly mounted in the wheel guards and wheels disposed within the wheel guards and revolubly mounted within the guards.

6. The combination of a frame carrying brackets at the front and rear thereof, and swivel casters carried by the brackets, each of said brackets having formed in it a pair of aligned bores, a second frame, a seat and handle bars carried thereby, rods pivotally mounted on the first and second frames, opposed rods pivotally mounted on the second frame, and means for securing the free ends of the last mentioned rods in the bores in the brackets.

7. A baby walker comprising a lower frame that is of greater length than width, bearings formed at the sides and ends of said frame, casters swiveled in said end bearings, an upper smaller circular ring, a rod swiveled to each side of said frames, a rod swiveled to the front and the rear of the upper frame, detachable means for connecting the last named rods to the front and to the rear of the elongated frame, a seat suspended from the upper frame, and a handle connected to the front of the upper frame and projecting forwardly therefrom.

8. An elongated lower frame with lateral side wheels and swiveled casters front and rear, an upper ring, a protruding steering handle projecting forward and upward from the ring, a seat suspended from the upper ring, and collapsible means for supporting the upper ring from the lower ring.

9. An elongated lower frame with a combination of fixed wheels and casters, an upper ring, a protruding steering handle projecting forward and upward from the ring, a seat suspended from the upper ring, and collapsible means for supporting the upper ring on the lower ring.

10. The combination of a frame carrying brackets at the front and rear thereof, and swivel casters carried by the brackets, each of said brackets having formed in it a pair of aligned bores, a second frame, a seat and handle bars carried thereby, rods pivotally mounted on the second frame, and means for securing the free ends of the last mentioned rods in the bores in the brackets.

11. A baby walker comprising a frame, a pair of wheels rotatable about aligned axes, one each of the wheels being mounted on the frame at opposite sides thereof, the wheels rotating in planes extending parallel with one another and the plane of normal forward movement of the baby walker, supplemental tractional supporting means for the frame and disposed at an end of the frame, and a seat flexibly supported by the frame and positioned between the wheels and said supplemental supporting means, the frame being entirely open to provide for unobstructed movement of the feet and limbs of a user and permitting controlled movement and turning of the baby walker in all directions.

12. In a baby walker the combination of an upper frame and a lower frame having central openings wherein a user may stand and walk, wheels at opposite sides of the lower frame and rotatable in parallelism with the longitudinal axis of the frame only, and a seat flexibly supported by one of the frames whereby the seat may be shifted laterally of the frames without laterally displacing the wheels.

13. In a baby walker the combination of an upper frame and a lower frame having central openings wherein a user may stand and walk, wheels at opposite sides of the lower frame and rotatable in parallelism with the longitudinal axis of the frame only, caster means carried by the lower frame for providing supplemental tractional support for the baby walker, and a seat flexibly supported by one of the frames whereby the seat may be shifted laterally of the frames without laterally displacing the wheels.

In testimony whereof, I have hereunto subscribed my name this 17th day of July, 1925.

SILAS B. BROWN.